(No Model.)
J. A. MULLEN.
DEVICE FOR CHECKING HORSES.
No. 562,016. Patented June 16, 1896.
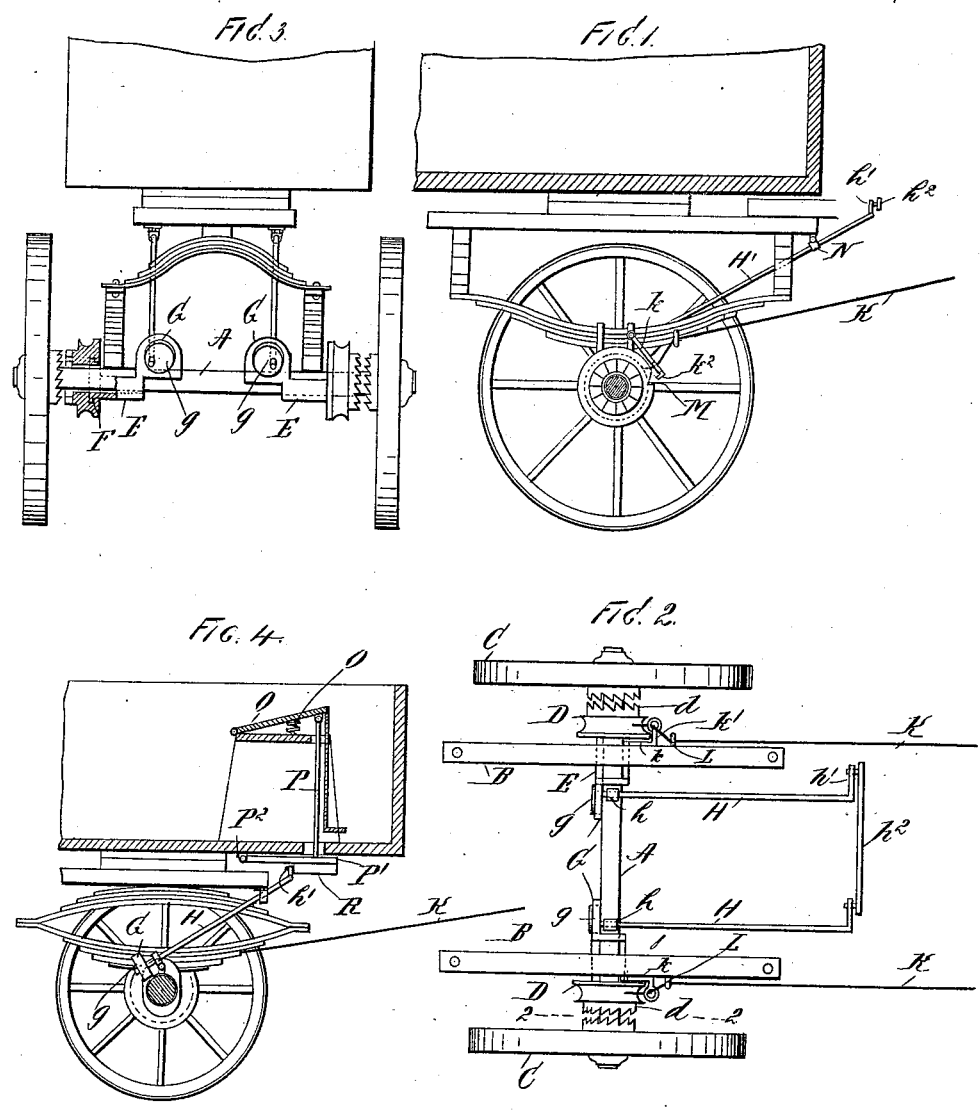
WITNESSES:
INVENTOR
Joseph A. Mullen,
BY
Edgar Tate & Co
ATTORNEYS.

UNITED STATES PATENT OFFICE.

JOSEPH A. MULLEN, OF NEW YORK, N. Y.

DEVICE FOR CHECKING HORSES.

SPECIFICATION forming part of Letters Patent No. 562,016, dated June 16, 1896.

Application filed August 29, 1895. Serial No. 560,894. (No model.)

*To all whom it may concern:*

Be it known that I, JOSEPH A. MULLEN, a citizen of the United States, and a resident of New York, in the county of New York and State of New York, have invented certain new and useful Improvements in Devices for Checking Horses, of which the following is a specification, reference being had to the accompanying drawings, forming a part thereof, in which similar letters of reference indicate corresponding parts.

This invention relates to devices for checking horses and preventing runaways; and the object thereof is to provide a simple, cheap, and perfectly-operating device which may be attached to a wagon or other vehicle in such manner that the revolution of the wheels will wind up or tighten reins or lines connected therewith and with the bridle-bit and thereby draw the horse backwardly, the construction and arrangement being such that the device may be automatically thrown out of gear when the vehicle is occupied or said device may be operated by hand; and with this and other objects in view the invention consists in the construction and arrangement of parts hereinafter described and claimed.

The invention is fully disclosed in the following specification, of which the accompanying drawings form a part, in which—

Figure 1 is a sectional view on the line 2 2 of Fig. 1; Fig. 2, a plan view; Fig. 3, a lower end view, and Fig. 4 a longitudinal vertical section showing a modified form of construction.

In the practice of my invention I mount on the axle A, between the springs B and the wheels C, drums D, provided with peripheral grooves and outwardly-directed hubs on which are formed serrations or teeth $d$, which are adapted to operate in connection with corresponding serrations or teeth formed on the hub of the wheels. Each of these drums is connected with a sleeve E, having at its outer end a rim or projection F, adapted to fit in a corresponding groove formed in the inner walls of the drum, and around which said drum is free to revolve. Each of said sleeves is provided with an upwardly-directed extension G at its inner end, in which is mounted an eccentric $g$, with which is connected a rod H, mounted in bearings $h$, secured to the axle, and each of which is extended forward and provided with a crank-arm $h'$, with which is connected an operating-bar $h^2$.

Connected with the drums D on each side is a cord or line K, which is passed through an eye formed on a pivoted pawl $k$, having an outwardly-directed crank-arm $k'$, and then through a staple or loop L, said pawl and said staple or loop being each connected with the spring B or its supports, and said lines are then carried forward and in operation are connected with the bridle-bit.

Formed on the inner flange or rim of each of the drums D is a notch or recess M, and formed on the outer end of the pawl $k$ is a projection $k^2$, which is adapted to operate in connection with said notch or recess M, and any desired number of said notches or recesses may be employed.

The operation will be readily understood from the foregoing description when taken in connection with the accompanying drawings. The parts being in the normal position, or that shown in Figs. 1 and 2, if a driver desires to leave a vehicle the bar $h^2$ is raised, which operation throws the drums D outwardly and causes the teeth $d$ thereon to interlock with the corresponding teeth formed on the hubs of the wheels, and if, when the parts are in this position, the horse should start to run the drums D will be revolved by the wheels, as will be readily understood, and the lines K will be wound thereon, and these lines will operate on the bridle-bit, as will be also understood, and the horse will be brought to a stop. In this operation the pawls $k$ will be drawn downward by the lines K, and the projection $k^2$ thereon, operating in connection with the notches or recesses M in the outer rims of the drums, will prevent the reverse movement of said drums.

The bars H may be supported in any desired manner at their forward ends; but I have shown in the drawings a yoke or loop N for these parts, which is secured to the forward end of the body of the vehicle or the running-gear thereof.

The construction shown in Fig. 3 is substantially the same as that hereinbefore described, with the exception that the rods H are automatically operated by means of a spring-supported seat O. Pivotally secured to the under forward side of this seat O is a downwardly-depending rod or bar P, which rests upon the forward end of the plate P', the rear end of which is pivotally connected with the bottom of the wagon-body at P², and the crank-arm h' of the rods or bars H is pivotally connected with a hanger R, which is secured to the plate P. In this form of construction when the occupant of the vehicle or driver thereof leaves it for any purpose the seat O is thrown backward by the spring O' and the rods or bars H are operated as hereinbefore described to operate the drums D and cause the same to interlock with the hubs of the wheels.

With my improved safety attachment the horse will be kept in the position in which he is left, and it is rendered impossible for the horse to run away when he is left alone or when he becomes frightened. The operation of the device is also gentle but firm, and the horse is checked before he has time to run or to get started, and if at any time the usual reins by which he is guided should be broken the locking device may at once be operated as hereinbefore described.

My improved safety attachment may be applied to any wagon, coach, carriage, or other vehicle, and it will thus be seen that I accomplish the object of my invention by means of a device which is simple in construction and operation and one which is comparatively inexpensive.

It will be seen that the rear sides of the teeth on the hubs of the wheels are beveled or inclined, and the front sides of the teeth on the drums are similarly formed, and the object of this arrangement is to provide means whereby when the lines K are unwound from the drums by the backing of the horse the pawls k will drop into the notches or recesses M in the rims of the drums and prevent the further revolution of the drums and further pressure on the lines K.

My invention is not limited to the exact form, construction, and arrangement of parts shown and described. Other devices may be employed by means of which the drums may engage the hubs in place of the projections or teeth formed thereon, and other modifications may be made without departing from the spirit of my invention or sacrificing its advantages, and I therefore reserve the right to make all such alterations as fairly come within the scope of the invention.

Having fully described my invention, I claim and desire to secure by Letters Patent—

1. In combination with a wagon, carriage or other vehicle, of the sliding sleeves having apertured enlargements, the drums provided with teeth secured thereon, the teeth carried by the hubs, the parallel rods having an eccentric upon their inner ends adapted to operate in the apertures in said enlargements, said rods having their ends bent at right angles, the transverse bar pivoted to said bent ends, whereby when said transverse bar is raised, the drums are thrown into engagement with said hubs, substantially as described.

2. In combination with a wagon, carriage, or other vehicle of the sliding sleeves having apertured enlargements, the drums provided with teeth secured thereon, the teeth carried by the hubs, the parallel rods having an eccentric upon their inner ends adapted to operate in the apertures in said enlargements, said rods having their ends bent at right angles, the transverse bar pivoted to said bent ends, the cords passing through loops secured to the spring, and attached to said drums, and the pivoted pawls secured to said springs and operating in connection with notches upon said drums, to stop the rotation of the latter, substantially as described.

3. In combination with a wagon, carriage or other vehicle, of the sliding sleeves having apertured enlargements, the drums provided with teeth carried by said sleeves, the teeth upon the hubs, the parallel rods carrying eccentrics, which operate in said openings, the pivoted lever to which the upper ends of said rods are connected, the auxiliary spring-actuated seat, the vertical rod connecting said seat and said lever, whereby when said seat is released, the drums are operated, the cords secured to said drums, and the pawls operating in connection with said drums, substantially as described.

In testimony that I claim the foregoing as my invention I have signed my name, in presence of the subscribing witnesses, this 28th day of August, 1895.

JOSEPH A. MULLEN.

Witnesses:
C. GERST,
S. L. HAWKSHURST.